US012806958B2

(12) United States Patent
Steinman et al.

(10) Patent No.: US 12,806,958 B2
(45) Date of Patent: Nov. 24, 2026

(54) ROTARY CAM-DRIVEN FLUID DISTRIBUTOR VALVE

(71) Applicant: Stoneridge Control Devices, Inc., Novi, MI (US)

(72) Inventors: Robert James Steinman, Lexington, OH (US); Benjamin Allen Harriger, Bellville, OH (US)

(73) Assignee: GHSP Control Devices, Inc., Holland, MI (US)

( * ) Notice: Subject to any disclaimer, the term of this patent is extended or adjusted under 35 U.S.C. 154(b) by 43 days.

(21) Appl. No.: 18/584,045

(22) Filed: Feb. 22, 2024

(65) Prior Publication Data

US 2025/0269697 A1 Aug. 28, 2025

(51) Int. Cl.
*B60H 1/00* (2006.01)

(52) U.S. Cl.
CPC ..... *B60H 1/00485* (2013.01); *B60H 1/00685* (2013.01)

(58) Field of Classification Search
CPC ............... B60H 1/00485; F16K 15/026; F16K 31/52408; F16K 31/52416
See application file for complete search history.

(56) References Cited

U.S. PATENT DOCUMENTS 2,206,356 A * 7/1940 Hutchings ............. F16K 15/063 137/538
2,575,940 A * 11/1951 Brown, Jr. ............ F16K 11/202 137/635
3,040,777 A * 6/1962 Carson ................ F16K 11/0743 137/625.46
4,570,663 A * 2/1986 Gould ................... F16K 11/166 137/630.2
6,920,845 B2 7/2005 Lelkes et al.
9,897,217 B2 2/2018 Greene
2008/0169026 A1* 7/2008 Sanchez ................ F16K 11/052 137/1
2012/0279462 A1 11/2012 Warnery et al.
2017/0074153 A1 3/2017 Kaneko et al.
(Continued)

FOREIGN PATENT DOCUMENTS

CN 109931148 A 6/2019
KR 102552090 B1 7/2023

OTHER PUBLICATIONS

International Search Report and Written Opinion for International Application No. PCT/US2024/016877 mailed Nov. 4, 2024.

*Primary Examiner* — Nicole Gardner
(74) *Attorney, Agent, or Firm* — Bodman PLC

(57) ABSTRACT

A coolant distributor valve for a vehicle cooling system includes a housing that provides multiple ports in fluid communication with a cavity, a disc that is arranged within the cavity and configured to be rotatable about an axis, the disc includes a cam profile, and multiple valve bodies that are operatively interconnected to the cam profile. Each of the multiple valve bodies are provided at corresponding one of the multiple ports and configured to be selectively movable between open and closed positions in response to the cam profile. Any of the multiple ports have its respective valve body in the open position that is in fluid communication with the cavity, and any of the multiple ports have its respective valve body in the closed position that is fluidly blocked from the cavity.

13 Claims, 9 Drawing Sheets

(56) References Cited

U.S. PATENT DOCUMENTS

| | | | | |
|---|---|---|---|---|
| 2018/0171860 | A1* | 6/2018 | Koh | F16K 31/52 |
| 2020/0049057 | A1 | 2/2020 | Lee | |
| 2022/0074510 | A1 | 3/2022 | Kim | |
| 2023/0098030 | A1 | 3/2023 | Liu et al. | |

* cited by examiner

ROTARY CAM-DRIVEN FLUID DISTRIBUTOR VALVE

TECHNICAL FIELD

This disclosure relates to a fluid distributor valve for use in vehicle cooling systems, for example.

BACKGROUND

A typical modern vehicle includes various components and subsystems for which it is desirable to regulate the temperature (i.e., heating and/or cooling to a desired temperature). One or more cooling loops include one or more heat exchangers through which one or more fluids are circulated in a controlled manner to provide cooling fluid at a desired temperature to the components. As vehicles have become more complex, the complexity of the cooling system has increased as well.

A typical cooling system found in vehicles such as those having electrified and/or hybrid drivetrains tend to be highly distributed architectures with a complex maze of cooling loops, sub-loops, pumps, and heat exchanges. Coolant distributor valves, controllers and temperature sensors used to direct the coolant through these cooling systems are separate and discrete from one another and distributed throughout the vehicle.

Typically, numerous valves are used to regulate the flow of coolant through the cooling loops. Common types of valves include ball valves, plate valves and/or drum valves. Some of these valves are difficult to seal reliably and/or may require an expensive, high torque actuator. In some cases where many ports are needed, a manifold may also be required. The resultant cooling system is complicated and expensive to implement and maintain.

SUMMARY

In one exemplary embodiment, a coolant distributor valve for a vehicle cooling system includes a housing that provides multiple ports in fluid communication with a cavity, a disc that is arranged within the cavity and configured to be rotatable about an axis, the disc includes a cam profile, and multiple valve bodies that are operatively interconnected to the cam profile. Each of the multiple valve bodies are provided at corresponding one of the multiple ports and configured to be selectively movable between open and closed positions in response to the cam profile. Any of the multiple ports have its respective valve body in the open position that is in fluid communication with the cavity, and any of the multiple ports have its respective valve body in the closed position that is fluidly blocked from the cavity.

In a further embodiment of any of the above, the coolant distributor valve includes an actuator that includes a motor and a gear train. The actuator is mounted to the housing and coupled the disc via the gear train.

In a further embodiment of any of the above, the cam profile is configured to slideably engage the valve body. The cam profile includes at least one peak and at least one valley that are interconnected by a ramped surface.

In a further embodiment of any of the above, the valley corresponds to the open position, and the peak corresponds to the closed position.

In a further embodiment of any of the above, the multiple ports each include a bore, and each valve body is provided by a plunger that is slideably received in a corresponding one of the bores. Each plunger is provided by a perimeter wall that extends from an open end and terminating in a closed end, and an aperture in the perimeter wall.

In a further embodiment of any of the above, the closed end is configured to slideably engage the cam profile, the closed end is configured to block fluid flow in the closed position, and the aperture extends from the bore into the cavity in the open position.

In a further embodiment of any of the above, the coolant distributor valve includes a seal beneath the closed end and the housing in the closed position.

In a further embodiment of any of the above, the coolant distributor valve includes a spring that is arranged in the bore between the plunger and the housing. The spring biases the closed end into engagement with the cam profile.

In a further embodiment of any of the above, one of the disc and the housing includes a pilot, and the other of the disc and the housing includes a collar that is nested with the pilot to provide a bearing.

In a further embodiment of any of the above, the disc includes a drive lug that is aligned with an opening in the housing. The drive lug is configured to be connected to an actuator.

In a further embodiment of any of the above, the coolant distributor valve includes a seal that is arranged in the opening between the drive lug and the housing.

In a further embodiment of any of the above, at least one of the multiple ports is provided without a valve body.

In a further embodiment of any of the above, the disc is a first disc, the cam profile is a first cam profile, and includes a second disc that has a second cam profile. The multiple valve bodies are operatively connected to the first and second cam profiles.

In a further embodiment of any of the above, the multiple valve bodies each include a lever arm that is pivotally mounted to the housing. The lever arm includes first and second ends opposite one another. The first end engages the cam profile, and the second end supports a seal that is configured to move between the open and closed positions in response to the cam profile.

In a further embodiment of any of the above, the coolant distributor valve includes a spring that is arranged between the housing and the first end and configured to bias the first arm into engagement with the cam profile.

These and other features of the present invention can be best understood from the following specification and drawings, the following of which is a brief description.

BRIEF DESCRIPTION OF THE DRAWINGS

The disclosure can be further understood by reference to the following detailed description when considered in connection with the accompanying drawings wherein:

FIG. 7A-10B illustrate another example coolant distributor valve having four different rotational positions relative to multiple valve bodies, FIGS. 7A and 7B respectively illustrate schematic top and cross-sectional views of the disc in a first rotational position, FIGS. 8A and 8B respectively illustrate schematic top and cross-sectional views of the disc in a second rotational position, FIGS. 9A and 9B respectively illustrate schematic top and cross-sectional views of the disc in a third rotational position, and FIGS. 10A and 10B respectively illustrate schematic top and cross-sectional views of the disc in a fourth rotational position.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1A:
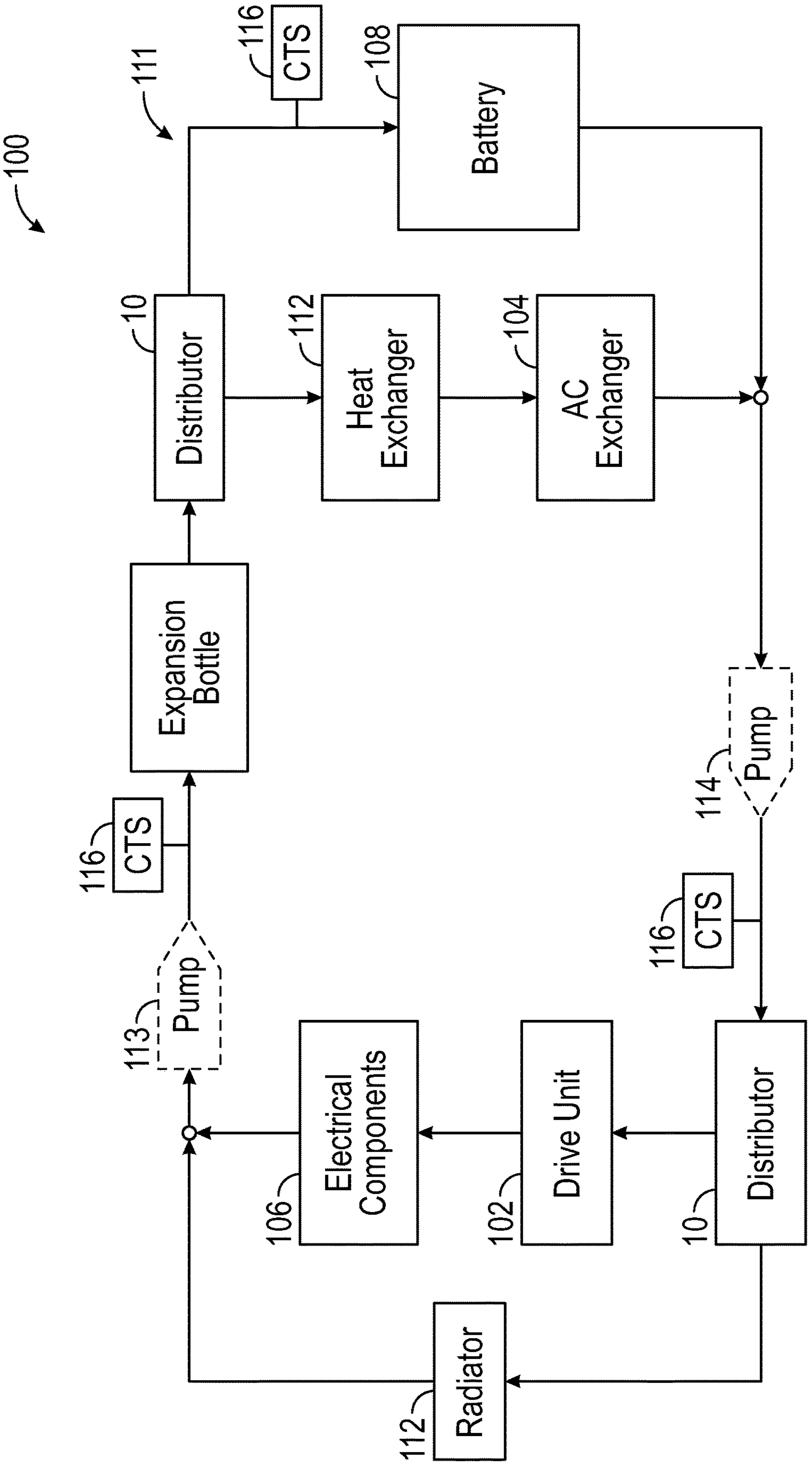
FIGS. 1A-1C are schematics of several example vehicle cooling systems.
Figure 1B:
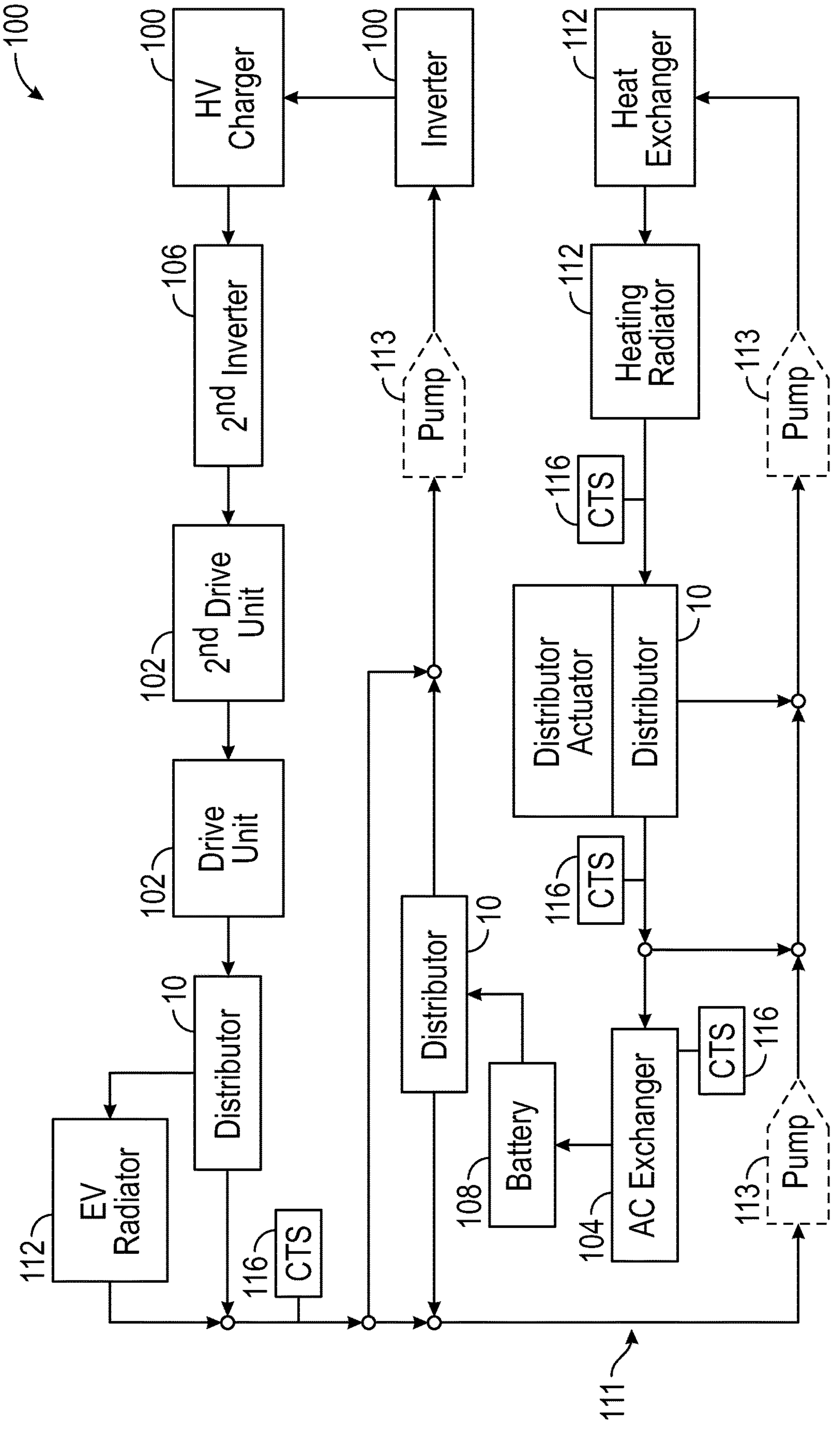
Figure 1C:
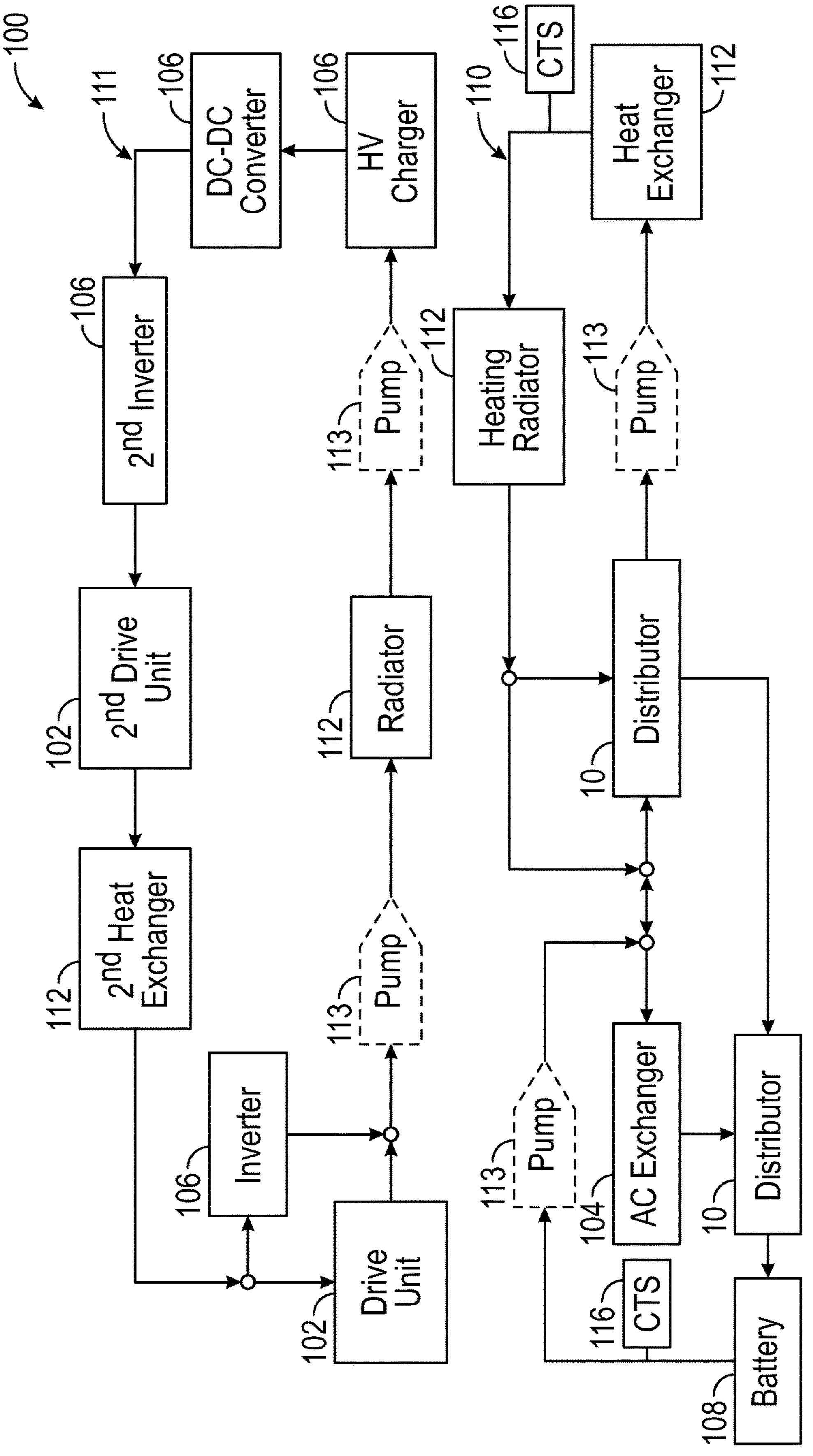

FIGS. 1A-1C, highly schematic and for illustrative purposes only, depict some aspects of typical example vehicle cooling systems 100. These cooling systems 100 tend to be relatively complex and include numerous loops, sub-loops, and branches for carrying a cooling fluid, such as a liquid coolant (e.g., water ethylene glycol). One type of vehicle using such a cooling system 100 includes one or more motors 102, an occupant cabin thermal conditioning system 104, a charging system 106, and a battery 108. One or more cooling loops 111 circulate the coolant through these components. Typically, multiple heat exchangers 112 are dispursed throughout the cooling loops 111 to provide a heat exchange from the coolant to another fluid such as air or another liquid coolant. One or more pumps 113 circulate the coolant through the cooling loops 111.

Multiple coolant distributor valves 10 connect multiple passages to selectively regulate the flow of coolant, and thus its temperature, through the cooling loops 111. The coolant distributor valves 10 are distributed throughout the cooling loops 111 as well as throughout the vehicle. Numerous temperature sensors 116 are also dispersed throughout the cooling system 100 to monitor the temperature at various locations in order to enable coordination of the various components to achieve desired temperatures throughout the system.

Figure 2:
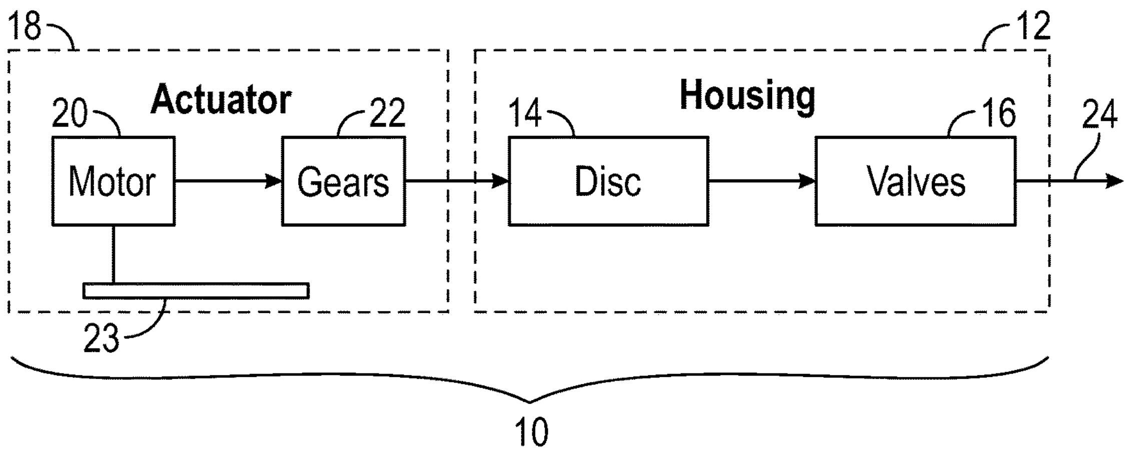
FIG. 2 schematically illustrates a disclosed coolant distributor valve with an actuator for operating the valve
Figure 3A:
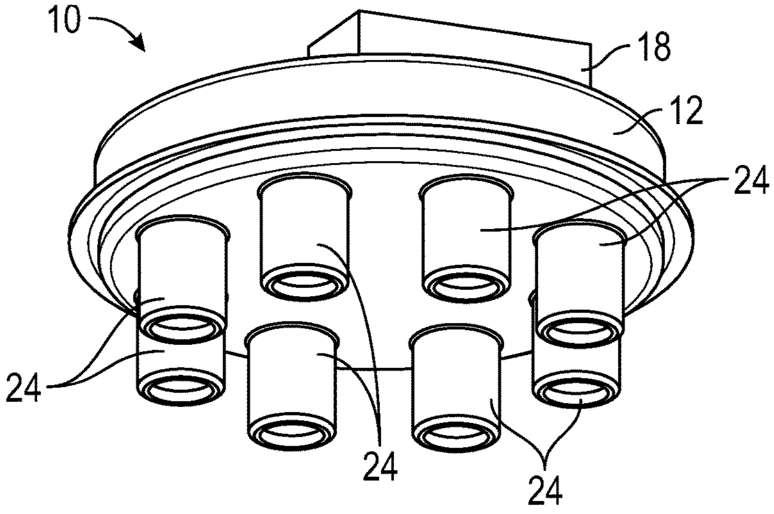
FIGS. 3A and 3B are respectively bottom perspective and top views of an example coolant distributor valve and actuator.
Figure 3B:
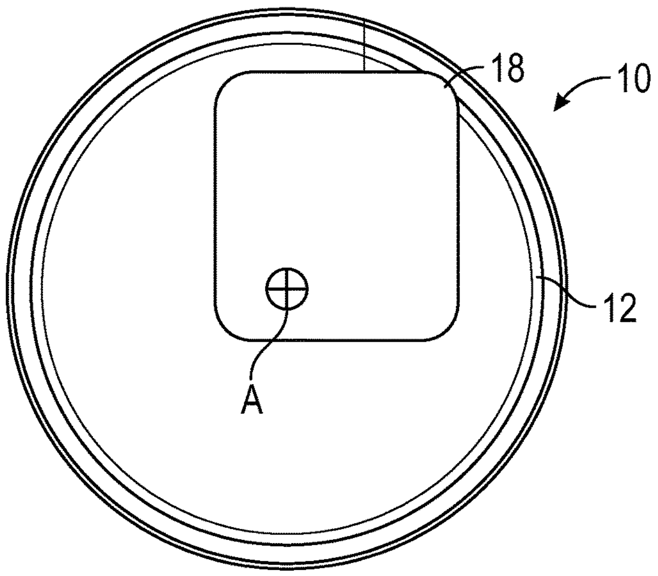
Figure 4:
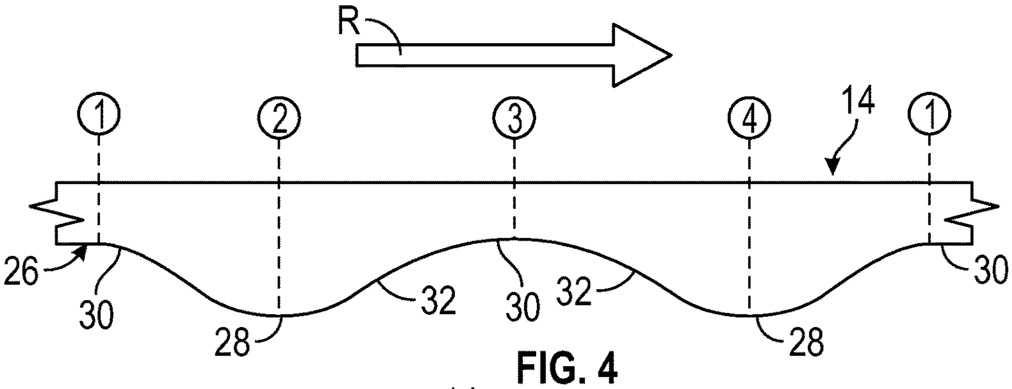
FIG. 4 is a schematic illustration of a disc and its cam profile for an example coolant distributor valve shown in FIGS. 5A-6B.
Figure 4A:
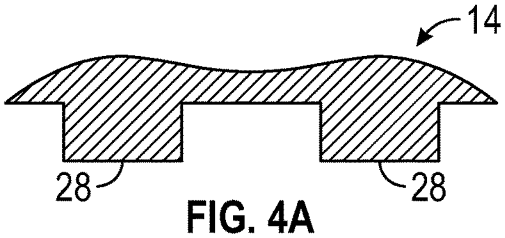
FIGS. 4A and 4B are cross-sectional views of the disc respectively taken along lines 4A-4A and 4B-4B in FIG. 5A.
Figure 4B:
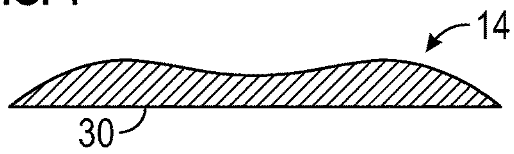

An example coolant distributor valve 10 is schematically shown in FIG. 2-3B. The coolant distributor valve 10 includes a housing 12 having a disc 14 that is rotatable about its axis A to selectively operate a circumferential array of valve bodies 16 to control the flow of coolant through its respective port 24. The housing 12 and disc 14 may be constructed from a plastic material. In one example, the disc 14 is rotated about the axis A by an actuator 18 mounted to the housing 12. The actuator 18 includes, for example, an electric motor 20 connected to a gear train 22 that rotationally drives the disc 14. A printed circuit board (PCB) 23 may be provided with the actuator 18 (e.g., internal to its housing 12) to provide motor control and/or position sensing to achieve and verify the rotational position of the disc 14, which corresponds to a desired combination of open and closed valve positions corresponding with a desired coolant flow within the system 100.

The controller (e.g., PCB 23) may be a hardware device for executing software, particularly software stored in memory. The controller (e.g., PCB 23) can be a custom made or commercially available processor, a central processing unit (CPU), an auxiliary processor among several processors associated with the controller, a semiconductor-based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. The memory can also have a distributed architecture, where various components are situated remotely from one another, but can be accessed by the processor.

In terms of hardware architecture, such a computing device can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The disclosed input and output devices that may be coupled to system I/O interface(s) may include input devices, for example but not limited to, a keyboard, mouse, scanner, microphone, camera, mobile device, proximity device, etc. Further, the output devices, for example but not limited to, a printer, display, etc. Finally, the input and output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

When the controller (e.g., PCB 23) is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed.

A highly schematic coolant distributor valve 10 and its disc 14 are shown in FIGS. 4-6B. The housing 12 provides a circumferential array of multiple ports 24 (e.g., four ports) in fluid communication with an internal cavity 25. The disc 14 is arranged within the cavity 25 and is configured to be rotatable in a direction R (FIG. 4) about its axis A, although the disc 14 may be rotated in either direction by the actuator 18. The disc 14 includes a circumferential cam profile 26 having at least one peak 28 and at least one valley 30 interconnected by a ramped surface 32. In one disclosed example, the valley 28 corresponds to the open position, and the peak 30 corresponds to the closed position.

Multiple valve bodies 34*a*, 34*b*, 34*c*, 34*d* (generally, "34") are operatively interconnected to the ring-shaped cam profile 26 (directly or indirectly). Each of the valve bodies 34 are provided at a corresponding one of the ports 24*a*, 24*b*, 24*c*, 24*d* (generally, "24") and are configured to be selectively movable between open and closed positions in response to the rotational position the cam profile 26 (e.g., positions 1, 2, 3, 4; numbered in FIGS. 4, 5A, 6A). In one example, the cam profile 26 directly slideably engages the valve bodies 34. In the example, any of the ports 24 having its respective valve body 34 in the open position is in fluid communication with the cavity 25 and, thus, with any other valve bodies 34 in an open position. Conversely, any of the ports 24 having its respective valve body 34 in the closed position is fluidly blocked from the cavity 25, preventing fluid communication with other ports 24 via the cavity 25.

Figure 5A:
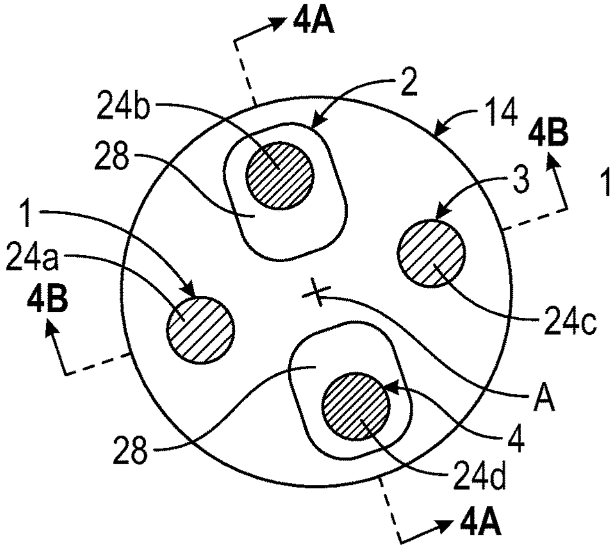
FIGS. 5A and 5B respectively illustrate schematic top and cross-sectional views of the disc shown in FIGS. 4-4B in a first rotational position relative to multiple valve bodies.
Figure 5B:
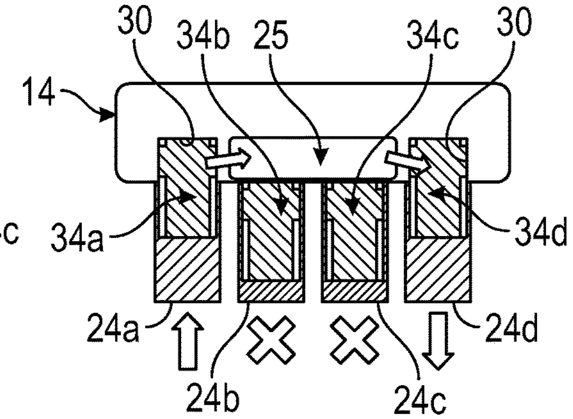
Figure 6A:
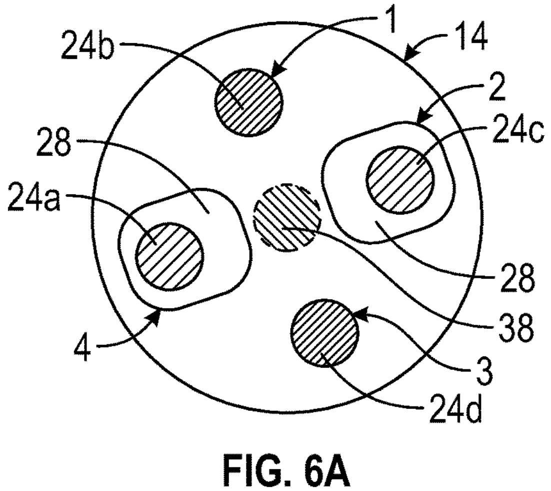
FIGS. 6A and 6B respectively illustrate schematic top and cross-sectional views of the disc shown in FIGS. 4-4B in a second rotational position relative to multiple valve bodies.
Figure 6B:
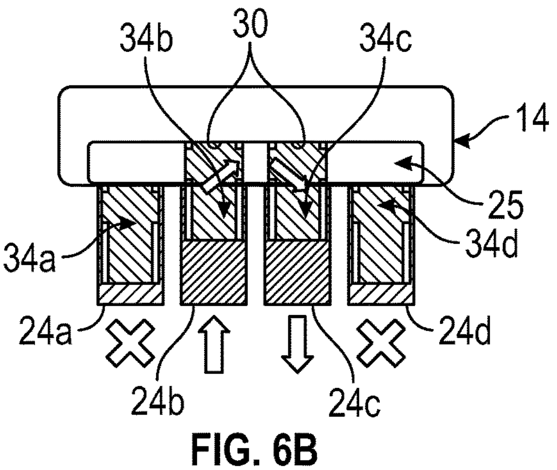
Figures 7A, 7B, 8A, 8B, 9A, 9B, 10A, 10B:
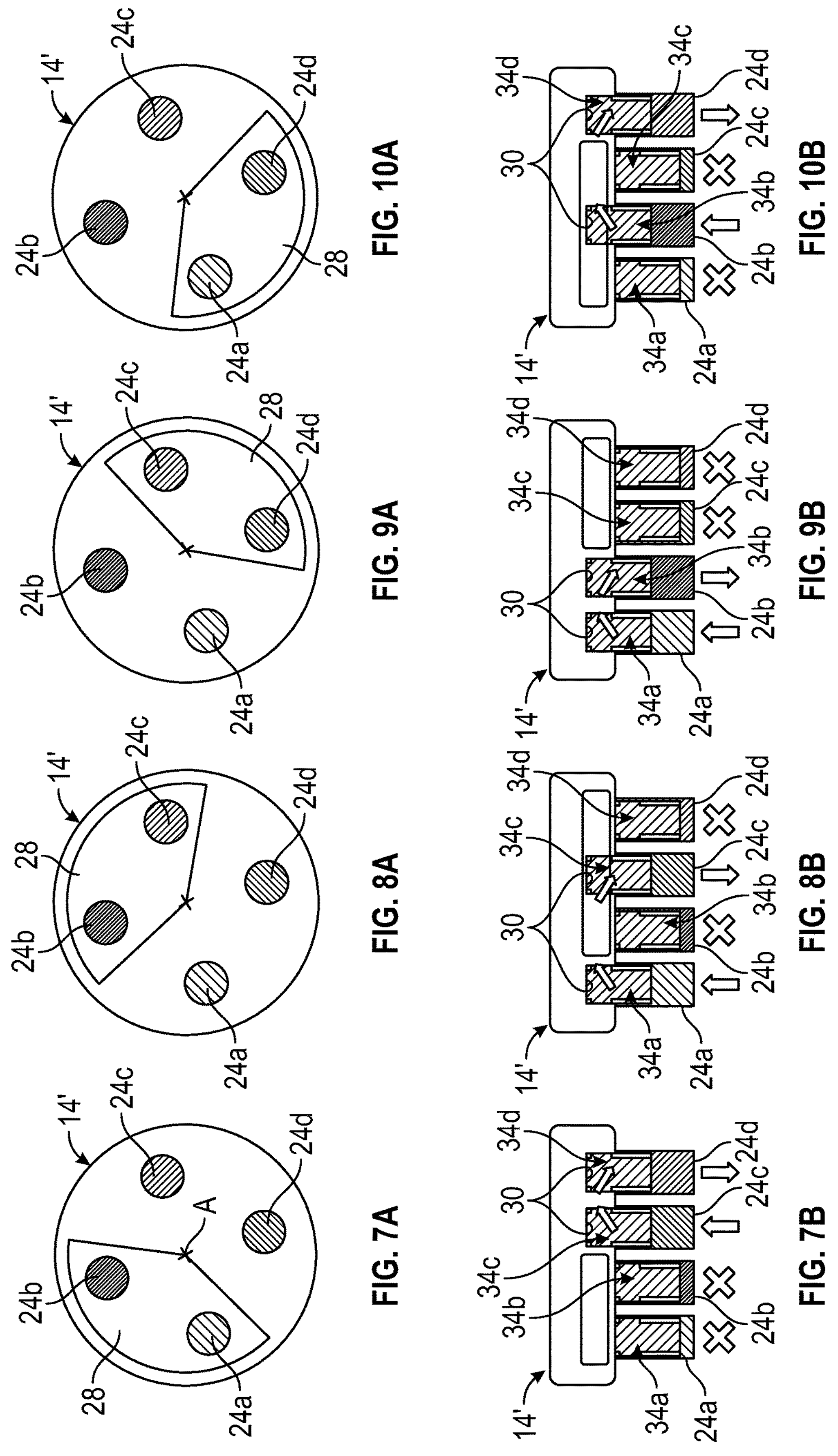

As shown in FIGS. 5A and 5B, with the disc 14 in a first rotational position, the peaks 28 maintain the valve bodies 34*b* and 34*c* in the closed position. The valve bodies 34*a* and 34*d* are permitted by the valleys 30 to move to the open position to fluidly connect the ports 24*a* and 24*d* to one another via the cavity 25. The disc 14 can be rotated 90° by the actuator 18 to close the valve bodies 34*a* and 34*d* with the peaks 28, as shown in FIGS. 6A and 6B, and permit the valve bodies 34*b* and 34*c* to move to open position relative to the valleys 30 thereby fluidly connecting the ports 24*b* and 24*c*. As shown in FIG. 6A, at least one port 38 can be provided without a valve body such that the port 38 is in fluid communication with the cavity 25 regardless of the rotation position of the disc 14.

As can be appreciated, the cam profile 26 can be designed to selectively fluidly connect and block the ports 24 with respect to one another depending upon the location of the peak(s) 28 and valley(s) 30. FIGS. 7A-10B illustrate another example four-port coolant distributor valve, but with a different disc 14' having a different cam profile. In a first rotational position (FIGS. 7A and 7B), a peak 28 fluidly blocks the ports 24*a*, 24*b*, and a valley 30 fluidly connects the ports 24*c*, 24*d*. In a second rotational position (FIGS. 8A and 8B), the peak 28 fluidly blocks the ports 24*b*, 24*d*, and the valley 30 fluidly connects the ports 24*a*, 24*c*. In a third rotational position (FIGS. 9A and 9B), the peak 28 fluidly blocks the ports 24*c*, 24*d*, and the valley 30 fluidly connects the ports 24*a*, 24*b*. In a fourth rotational position (FIGS. 10A and 10B), the peak 28 fluidly blocks the ports 24*a*, 24*c*, and the valley 30 fluidly connects the ports 24*b*, 24*d*. It should also be understood that any number of valve bodies 34 and ports 24 may be used depending upon the system requirements.

Figure 11A:
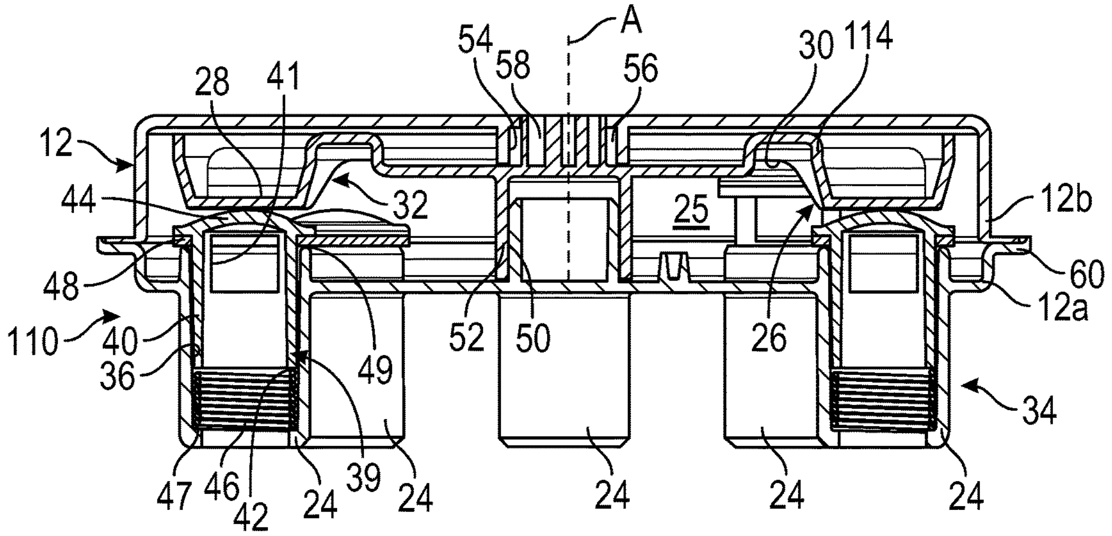
FIG. 11A is a cross-sectional view of another example coolant distributor valve.
Figure 11B:
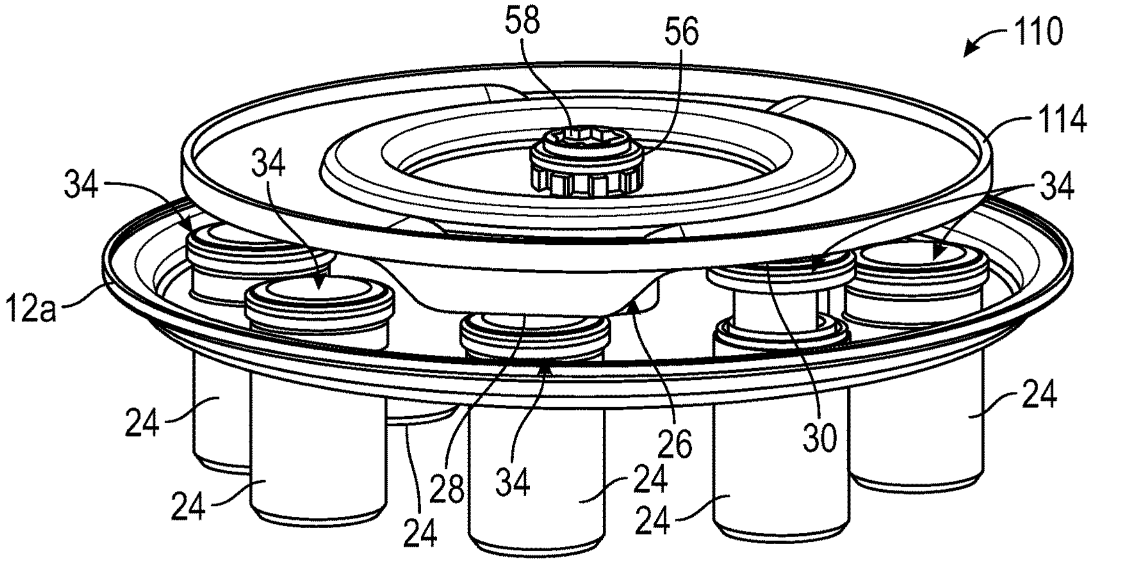
FIG. 11B is a perspective view of the coolant distributor valve shown in FIG. 11A with a portion of its housing removed.
Figure 11C:
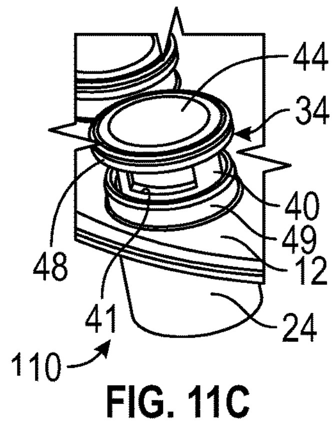
FIG. 11C is a perspective view of one of the valve bodies shown in FIG. 11A in an open position.
Figure 12:
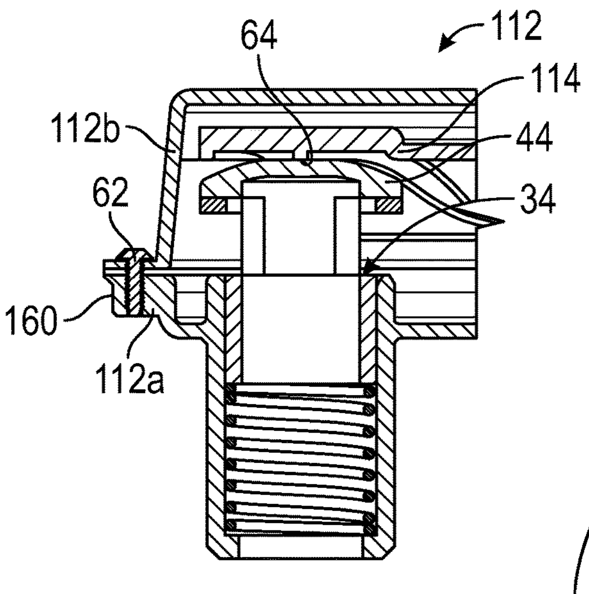
FIG. 12 illustrate another example way of securing first and second housing portions to one another.

Another example coolant distributor valve 110 with a disc 114 for an eight-port configuration is shown in FIGS. 11A-11C. One example valve body 34 is shown in more detail and is suitable for the embodiments illustrated in FIGS. 5A-10B. Each port 24 includes a bore 36, and each valve body 34 is provided by a plunger 39 slideably received in a corresponding one of the bores 36 and moveable between the open and closed positions along a longitudinal axis, which is parallel with the axis A. The plunger 39 is provided by a perimeter wall 40 (e.g., cylindrical) extending from an open end 42 and terminating in a closed end 44, which may have a domed shape to reduce friction with the cam profile 26. The cam profile 26 may include a protrusion 64 (FIG. 12) that further reduces friction. At least one aperture 41 is provided in the perimeter wall 40.

A seal 48 is arranged beneath the closed end 44 and an annular seat 49 extending from the housing 12. The seal 48 prevents fluid flow past the plunger 39 in the closed position when aligned with a peak 28. A spring 46 is arranged in the bore 36 between the plunger 39 and a shoulder 47 provided by the housing 12. The spring 46 biases the closed end 44 into engagement with the cam profile 26. Thus, the closed end 44 is arranged to slideably engage the cam profile 26 and block fluid flow when in the closed position. The aperture 41 extends from the bore 36 in response to the spring force into the cavity 25 in the open position when aligned with a valley 30.

A bearing is provided to align the disc 114 relative to the housing 12 for rotation about the axis A. In one example, the disc 114 includes a pilot 50, and the housing 12 includes a collar 52 that receive the pilot 50 in a nested relationship. Of course, this arrangement can be reversed, if desired. The housing 12 includes first and second housing portions 12*a*, 12*b* secured to one another at a peripheral flange 60, for example, be welding or gluing. In the example shown in FIG. 12, the first and second housing portions 112*a*, 112*b* may be secured using fasteners 62 at the peripheral flange 160.

Returning to FIG. 11A, the disc 114 includes a drive lug 58 aligned with an opening 54 in the housing 12. The drive lug 58 is connected to the actuator 18 (e.g., at an output shaft of the gear train 22). A seal 56 is arranged in the opening 54 between the drive lug 58 and the housing 12 to retain coolant within the cavity 25.

Figure 13:
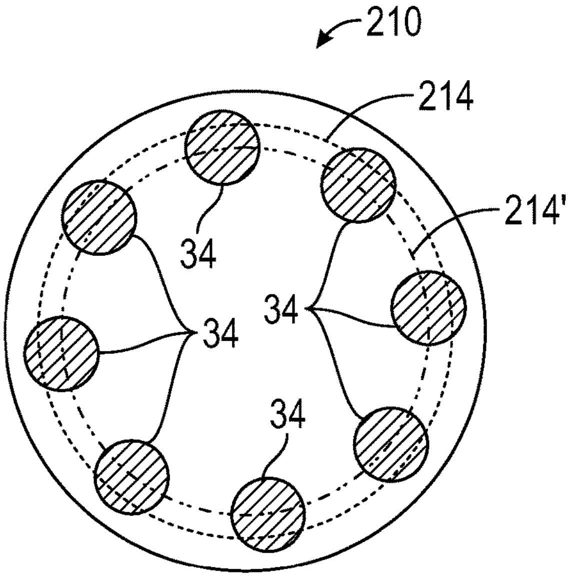
FIG. 13 schematically illustrates a multi-disc coolant distributor valve configured to actuate the valve bodies with different cam profiles.
Figure 14:
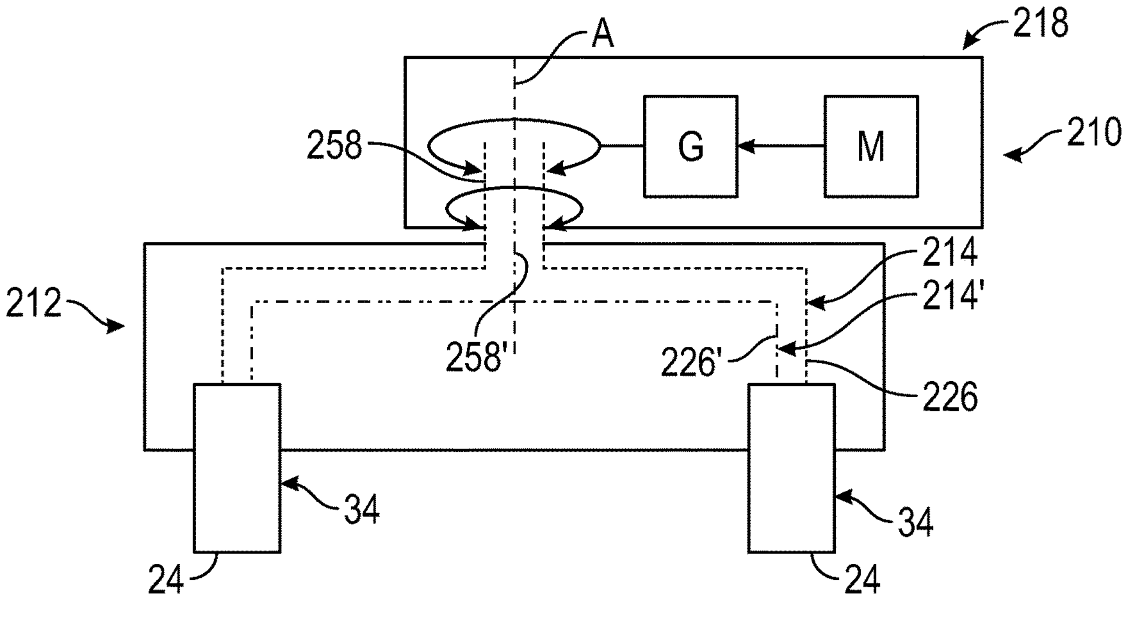
FIG. 14 is a schematic cross-section of the coolant distributor valve shown in FIG. 13.

Referring to FIGS. 13 and 14, multiple discs can be used to provide different cam profiles for the same circumferential array of valve bodies 34 (shown), which provides even more combinations for opening and closing the valve bodies. Alternatively or additionally, multiple discs can be used to control concentric arrays of valve bodies 34. The coolant diverter valve 210 first and second discs 214, 214' arranged with a common housing 212, and which respectively provide first and second cam profiles 226, 226'. In one example, the discs 214, 214' respectively include drive lugs 258, 258' that are concentric with one another about the axis A and are driven by a common actuator 218.

Figure 15A:
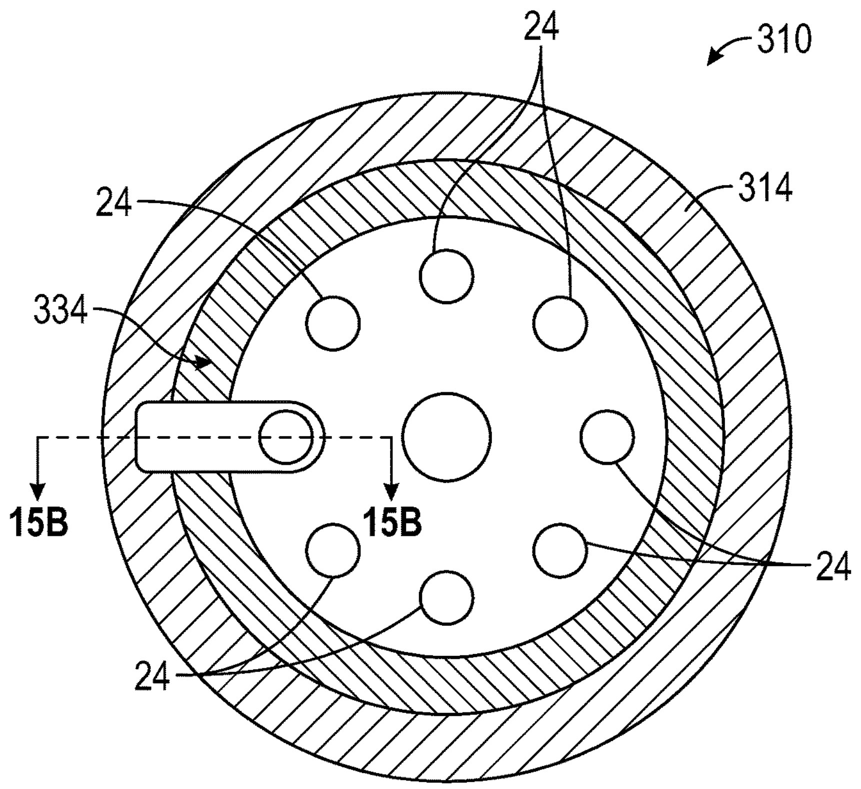
FIG. 15A illustrates a schematic top view of another example coolant distributor valve having another valve body configuration.
Figure 15B:
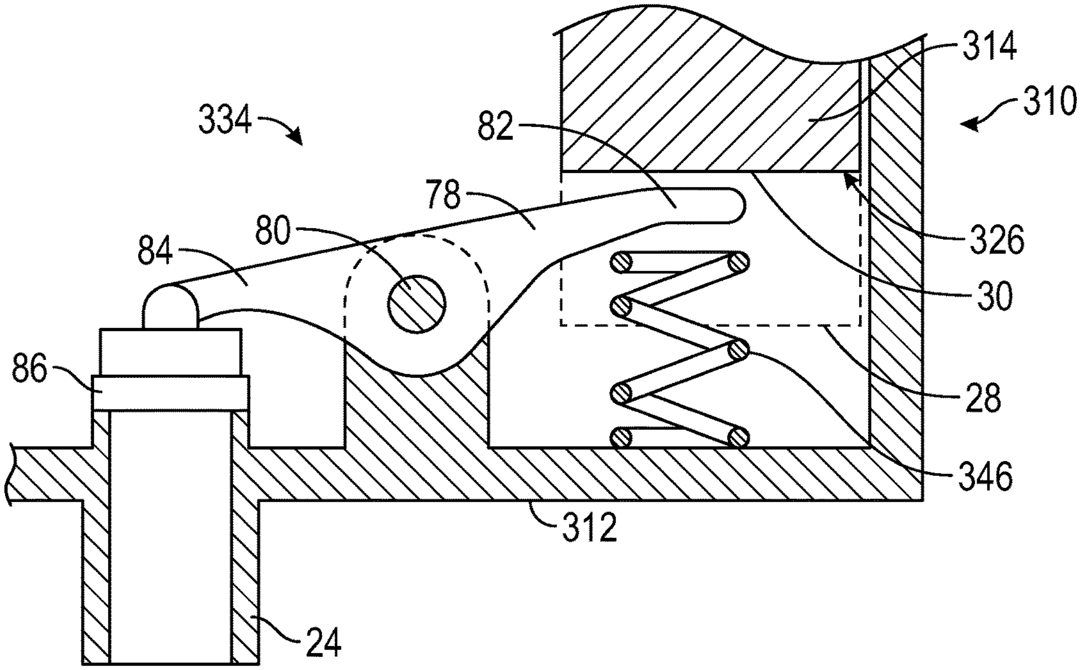
FIG. 15B is a cross-sectional view taken along line 15B-15B through the other valve body.

Another example coolant distributor valve 310 is shown in FIGS. 15A and 15B. The disc 314 and its cam profile 326 operate an array of valve bodies 334 to selectively control the flow of fluid through the ports 24. In this example, the valve bodies 334 each include a lever arm 78 pivotally mounted to the housing 312 at fulcrum 80. The lever arm 78 includes first and second ends 82, 84 arranged opposite one another, with the first end 82 engaging the cam profile 326. The second end 84 supports a valve seal 86 that moves between the open and closed positions in response to the cam profile 326. A spring 346 is arranged between the housing 312 and the first end 82 to bias the first arm 82 into engagement with the cam profile 326.

The disclosed coolant valve distributors 10, 110, 210, 310 provide a arrangement of multiple valve bodies to control fluid flow through multiple ports using less torque, which permits the use of smaller, less costly actuators. The disclosed coolant valve distributors 10, 110, 210, 310 provide simpler construction with improved durability and more flexible design.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A coolant distributor valve of for a vehicle cooling system, comprising:

a housing providing multiple ports in fluid communication with a cavity;

a disc arranged within the cavity and configured to be rotatable about an axis, the disc including a cam profile;

multiple valve bodies operatively interconnected to the cam profile, each of the multiple valve bodies provided at corresponding one of the multiple ports and configured to be selectively movable between open and closed positions in response to the cam profile, wherein any of the multiple ports having its respective valve body in the open position being in fluid communication with the cavity, and any of the multiple ports having its respective valve body in the closed position being fluidly blocked from the cavity; and wherein the disc is a first disc, the cam profile is a first cam profile, and comprising a second disc having a second cam profile, the multiple valve bodies operatively connected to the first and second cam profiles to be selectively movable between the open and closed positions in response thereto, wherein the first and second discs are respectively driven by first and second drive lugs, wherein the multiple ports each include a bore, and each valve body is provided by a plunger slideably received in a corresponding one of the bores, each plunger provided by a perimeter wall extending from an open end and terminating in a closed end, and an aperture in the perimeter wall.

2. The coolant distributor valve of claim 1, comprising an actuator including a motor and a gear train, the actuator mounted to the housing and coupled to the disc via the gear train.

3. The coolant distributor valve of claim 1, wherein the cam profile is configured to slideably engage the valve body, the cam profile includes at least one peak and at least one valley interconnected by a ramped surface.

4. The coolant distributor valve of claim 3, wherein the at least one valley corresponds to the open position, and the at least one peak corresponds to the closed position.

5. The coolant distributor valve of claim 1, wherein the closed end is configured to slideably engage the cam profile, the closed end configured to block fluid flow in the closed position, and the aperture extending from the bore into the cavity in the open position.

6. The coolant distributor valve of claim 5, comprising a seal beneath the closed end and the housing in the closed position.

7. The coolant distributor valve of claim 1, comprising a spring arranged in the bore between the plunger and the housing, the spring biasing the closed end into engagement with the cam profile.

8. The coolant distributor valve of claim 1, wherein one of the disc and the housing includes a pilot, and the other of the disc and the housing includes a collar that is nested with the pilot to provide a bearing.

9. The coolant distributor valve of claim 8, wherein the first and second drive lugs are concentric with one another.

10. The coolant distributor valve of claim 9, comprising a seal arranged in an opening between one of the first and second drive lugs and the housing.

11. The coolant distributor valve of claim 1, wherein at least one of the multiple ports is provided without a valve body.

12. The coolant distributor valve of claim 1, wherein the first and second drive lugs are connected to a common actuator.

13. A coolant distributor valve for a vehicle cooling system, comprising:

a housing providing multiple ports in fluid communication with a cavity;

a disc arranged within the cavity and configured to be rotatable about an axis, the disc including a cam profile;

multiple valve bodies operatively interconnected to the cam profile, each of the multiple valve bodies provided at corresponding one of the multiple ports and configured to be selectively movable between open and closed positions in response to the cam profile, wherein any of the multiple ports having its respective valve body in the open position being in fluid communication with the cavity, and any of the multiple ports having its respective valve body in the closed position being fluidly blocked from the cavity, wherein the multiple valve bodies each include a lever arm pivotally mounted to the housing, the lever arm including first and second ends opposite one another, the first end engaging the cam profile, and the second end supporting a seal configured to move between the open and closed positions in response to the cam profile; and a spring arranged between the housing and the first end and configured to bias the lever arm into engagement with the cam profile.

* * * * *